US010462729B2

(12) United States Patent
Johnson et al.

(10) Patent No.: US 10,462,729 B2
(45) Date of Patent: Oct. 29, 2019

(54) ROAMING MANAGEMENT (71) Applicant: British Telecommunications Public Limited Company, London (GB)

(72) Inventors: Stephen Johnson, London (GB); Stephen Dyett, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 16/086,328

(22) PCT Filed: Mar. 27, 2017

(86) PCT No.: PCT/EP2017/057206
§ 371 (c)(1),
(2) Date: Sep. 19, 2018

(87) PCT Pub. No.: WO2017/167695
PCT Pub. Date: Oct. 5, 2017

(65) Prior Publication Data
US 2019/0098556 A1 Mar. 28, 2019

(30) Foreign Application Priority Data

Mar. 31, 2016 (EP) .................................... 16163212

(51) Int. Cl.
H04W 4/00 (2018.01)
H04W 48/02 (2009.01)
H04W 8/12 (2009.01)

(52) U.S. Cl.
CPC ............ *H04W 48/02* (2013.01); *H04W 8/12* (2013.01)

(58) Field of Classification Search
CPC .................. H04W 48/02; H04W 8/12

USPC ....................................................... 455/432.1
See application file for complete search history.

(56) References Cited

U.S. PATENT DOCUMENTS

| 8,929,931 | B1 | 1/2015 | Goldberg et al. |
| 10,111,159 | B2 * | 10/2018 | Scahill ............... H04L 63/0892 |
| 2011/0243020 | A1 | 10/2011 | Ponnuswamy |
| 2014/0094142 | A1 | 4/2014 | Tones et al. |
| 2014/0328257 | A1 | 11/2014 | Kamlani |

(Continued)

FOREIGN PATENT DOCUMENTS

CN 105101337 A * 11/2015
EP 2 645 783 A1 10/2013
(Continued)

OTHER PUBLICATIONS

U.S. Appl. No. 16/335,417, filed Mar. 21, 2019.
(Continued)

*Primary Examiner* — Amancio Gonzalez
(74) *Attorney, Agent, or Firm* — Patterson Thuente Pedersen, P.A.; Amy Salmela (57) ABSTRACT

A method of operating an interconnect server for a roaming network, the roaming network having a plurality of cellular networks and a plurality of hotspot networks formed of wireless access points, the interconnect server being connectable to a routing server within each of the plurality of cellular networks and to a routing server within each of the plurality of hotspot networks, wherein the plurality of hotspot networks are operable to allow subscriber devices of the plurality of cellular networks to connect to a wireless access point forming part of the hotspot network and access the device's subscriber cellular network, is disclosed.

11 Claims, 7 Drawing Sheets

(56) References Cited

U.S. PATENT DOCUMENTS

| | | |
|---|---|---|
| 2015/0365158 A1 | 12/2015 | Kindler |
| 2016/0036922 A1 | 2/2016 | Centemeri et al. |
| 2017/0347298 A1 | 11/2017 | Brown et al. |
| 2017/0359759 A1 | 12/2017 | Brown et al. |

FOREIGN PATENT DOCUMENTS

| | | | |
|---|---|---|---|
| EP | 2 741 535 A1 | | 6/2014 |
| GB | 2 485 388 A | | 5/2012 |
| GB | 2485388 A | * | 5/2012 |
| GB | 2 554 462 A | | 4/2018 |
| WO | WO 2013/152305 A1 | | 10/2013 |
| WO | WO 2018/060058 A1 | | 4/2018 |
| WO | WO 2018/060092 A1 | | 4/2018 |

OTHER PUBLICATIONS

U.S. Appl. No. 16/338,553, filed Apr. 11, 2019.

International Search Report and Written Opinion of Application No. PCT/EP2017/057206, dated Apr. 24, 2017, 14 pages.

International Search Report and Written Opinion for corresponding International Application No. PCT/EP2017/073961 dated Dec. 21, 2017, 9 pages.

International Search Report and Written Opinion for corresponding International Application No. PCT/EP2017/074056 dated Nov. 11, 2017, 9 pages.

"$3^{rd}$ Generation Partnership Project: Technical Specification Group Core Network and Terminals: 3GPP System to Wireless Local Area Network (WLAN) interworking; WLAN User Equipment (WLAN UE) to network protocols; Stage 3 (Release 12)", 3GPP Standard; 3GPP TS 24.234, $3^{rd}$ Generation Partnership Project (3GPP), Mobile Competence Centre; 650, Route Des Lucioles; F-06921 Sophia-Antipolis Cedex; France, vol. CT WG1, No. V12.2.0, Mar. 20, 2015 (Mar. 20, 2015), pp. 1-40, XP050927885, section 6, pp. 20-26 and section 8, pp. 28-36.

* cited by examiner

ROAMING MANAGEMENT

CROSS-REFERENCE TO RELATED APPLICATION

The present application is a National Phase entry of PCT Application No. PCT/EP2017/057206, filed Mar. 27, 2017, which claims priority from EP Patent Application No. 16163212.0, filed Mar. 31, 2016 each of which is hereby fully incorporated herein by reference.

TECHNICAL FIELD

The present disclosure relates to cellular networks and in particular to a method and apparatus for updating the management of network roaming by client devices.

BACKGROUND

In cellular mobile networks, it is known for the network to be comprised of a network core and a radio access network of cellular base stations known as eNodeBs. User Entities (UEs) such as mobile phones and cellular network enabled computers belonging to subscribers of the cellular network wirelessly connect to an eNodeB for communication with the other subscribers of the cellular network and subscribers of other cellular networks for voice calls, Short Message Service (SMS) exchange and data sessions.

To facilitate communicate with other cellular networks, the network core includes packet data gateways (PDWs) for routing data between subscribers and correspondent nodes located on different external networks. These external networks include the Internet and also the GPRS Roaming Exchange (GRX) network which allows for a dedicated interconnect network between MNO cellular networks.
Roaming In general, a UE will connect to the cellular network to which it is a subscriber, hereinafter referred to as a home cellular network, for voice and data connectivity. However, this connectivity is limited to the geographic area covered by the home cellular network's radio access network of eNodeBs. Roaming is a term used to describe a scenario whereby a UE connects to a different cellular network in order to receive voice and data connectivity where the home cellular network has no presence. The most common example of roaming is where the UE is located in a different country and there are commercial agreements in place between the local cellular network and the home cellular network with regards to network access and pricing.

The GRX network is used to link the cellular networks in different countries together so that a roaming UE can continue to have network connectivity albeit at a different pricing model. In general, authentication is carried out via a C7 network and data is tunneled between the UE and its home cellular network via the GRX using data tunnels.

There are numerous advantages for a Mobile Network Operator (MNO) of a cellular network to use GRX:
  Only one commercial agreement, namely between the MNO and the GRX provider
  Each MNO only needs to provision a secure interconnect from their core network to the GRX;
  The GRX provides a secure, private and QoS enabled network; and
  Only one organization is needed to deal with billing and accounting.

Without the GRX, each MNO would need to setup commercial and physical arrangements with each foreign operator that is enabled for roaming.
Wi-Fi Wireless Local Area Networks (WLANs) and Hotspot Networks Wireless local area networks (WLAN) are type of non-cellular wireless data connectivity technology in common use. The IEEE 802.11 family of standards, commonly known as Wi-Fi™ define the operation of WLANs.

A WLAN is generated by a wireless access point (WAP) operating in the 2.4 Ghz and 5 Ghz frequency range. The WLAN enables data connectivity to WLAN devices having a suitable wireless network adaptor card. Due to transmission power constraints, WLANs generally only extend for tens of meters from the WAP.

Although a single WLAN of a WAP only provides a limited range of connectivity, it is possible to extend the reach of a particular Wi-Fi based network by forming clusters of WAPs managed by a network core resulting in what is known as a hotspot network. In a hotspot network many hundreds of short range WAPs can be located over a geographical area and all configured to present the same wireless network name known as a Service Set Identifier (SSID). The plurality of wireless access points are connected to a network core which handles authentication and data transfer so that a hotspot network user has mobility within the hotspot network. Authentication to the hotspot network can be provided using a username and password login. An example of a WiFi Operator (WFO) is British Telecommunications plc in the UK which operates a hotspot network currently known as BT WiFi™.

Most UEs of a cellular network also have WLAN interfaces in addition to their cellular network interfaces and in general the UE preference is to use WLANs where available. From a user perspective, WLAN access is beneficial because cellular network access is normally provided with tiered monthly data allowances and once the allowance, e.g. 1 GB is used up, data is charged per megabyte which becomes expensive. In general, WLAN data access is uncapped and in some circumstances can provide faster data speeds. From an MNO perspective, WiFi Offload is desirable because it reduces the burden on the cellular network.

It is known for MNOs and WFOs to have commercial agreements so that cellular subscribers can access a hotspot network as part of their cellular subscription package with their home network. This is sometimes implemented by assigning the subscriber of the cellular network a set of login credentials to the partner hotspot network.

To improve the hotspot access for a UE, it is also known to automate the authentication in accordance with variants of the Extensible Authentication Protocol (EAP). For example, EAP-TLS uses certificates installed on the UE to authenticate access while EAP-SIM uses a SIM card present in the UE to authenticate. Both methods do not require user interaction to join a hotspot network.

When a subscriber of a cellular network is abroad and therefore cannot use their UE to connect to the radio access network of their home cellular network, prior established roaming agreements between MNOs will allow their cellular device to have the option to roam onto a local cellular network over the GRX. However, roaming to a visitor cellular network, i.e. any cellular network which is not the UE's home cellular network, is regarded as being expensive due to high termination charges. The potential for shock high bills, in particular those incurred by data roaming, can often lead to many users opting to switch off their UEs completely or only allowing voice roaming. In general users prefer to connect to free or cheap WLANs available for example at hotels or cafes. This loss of convenience and functionality to access data and subsequent reduction in quality of experience is considered a necessary compromise to avoid large overseas data charges. However, this can cause a different set of problems in relation to data security and setup issues.

In addition to the roaming agreements under the GRX, MNOs have therefore turned to roaming agreements with overseas WFOs to allow their subscribers to use roaming data more freely. More importantly, the data is often tunneled back to the UE's home cellular network so that the MNO can continue to learn about the user's usage patterns and also control how information is gathered and presented to a subscriber. For example, web pages would be displayed in the user's home language and not the local language.

In a similar manner to the reasons for GRX, as the number of hotspot networks increases, it is a burden to create bilateral agreements across many different countries and hotspots. To address this issue, a roaming service such as the BT WiFi Roam™ is a known platform for allowing UEs to connect to hotspot networks using EAP SIM and other non-SIM based authentication methods as credentials.

A roaming hub interconnect has interfaces to communicate with the hotspot networks and also a number of cellular network facing interfaces. The hotspot networks can be regarded as further radio access networks of the home cellular network when the UE is roaming.

While the purpose of the roaming hub interconnect is to connect networks, due to commercial or political considerations, there may be reasons for not allowing subscribers of a particular cellular network to connect to a particular hotspot network. Each cellular and hotspot network is therefore configured manually to specify an access list, typically in the form of a white list or blacklist of allowable or rejected networks respectively.

A problem with this approach is that the blacklists are generally static and therefore there will be problems arising from data staleness resulting in UEs not being able to connect to newly added networks and blacklisting networks in response to a commercial or political situation.

SUMMARY

The present disclosure addresses these issues.

In one aspect, an embodiment of the present disclosure provides a method of operating an interconnect server for a roaming network, the roaming network having a plurality of cellular networks and a plurality of hotspot networks formed of wireless access points, the interconnect server being connectable to a routing server within each of the plurality of cellular networks and to a routing server within each of the plurality of hotspot networks, wherein the plurality of hotspot networks are operable to allow subscriber devices of the plurality of cellular networks to connect to a wireless access point forming part of the hotspot network and access the device's subscriber cellular network, comprising: receiving from at least one of the plurality of cellular networks' routing servers an access list specifying access permissions identifying at least one hotspot network which can be used by its subscribers for data roaming; storing the access list received from at least one cellular network; processing the access lists to generate for each hotspot network, a routable roaming list identifying cellular networks can be reached via the interconnect server; and sending the generated routable roaming lists to the respective hotspot network, wherein the generated routable roaming lists are for configuring the hotspot network to route traffic of subscriber devices of the cellular networks in accordance with the access permissions received from the at least one plurality of cellular networks.

In another aspect, an embodiment of the present disclosure provides an apparatus for a roaming network, the roaming network having a plurality of cellular networks and a plurality of hotspot networks formed of wireless access points, wherein the plurality of hotspot networks are operable to allow subscriber devices of the plurality of cellular networks to connect to a wireless access point forming part of the hotspot network and access the device's subscriber cellular network, comprising: a first network interface for connecting to a routing server within each of the plurality of cellular networks; a second network interface for connecting to a routing server within each of the plurality of hotspot networks; a receiver for receiving from at least one of the plurality of cellular networks' routing servers an access list specifying access permissions identifying at least one hotspot network which can be used by its subscribers for data roaming; a data store for storing the access list received from at least one cellular network; a processor for processing the access lists to generate for each hotspot network, a routable roaming list identifying cellular networks can be reached via the interconnect server; and a data sender for sending the generated routable roaming lists to the respective hotspot network, wherein the generated routable roaming lists are for configuring the hotspot network to route traffic of subscriber devices of the cellular networks in accordance with the access permissions received from the at least one plurality of cellular networks.

BRIEF DESCRIPTION OF THE DRAWINGS

Embodiments of the present disclosure will now be described with the aid of the following Figures in which.

DESCRIPTION

Overview

Figure 1:
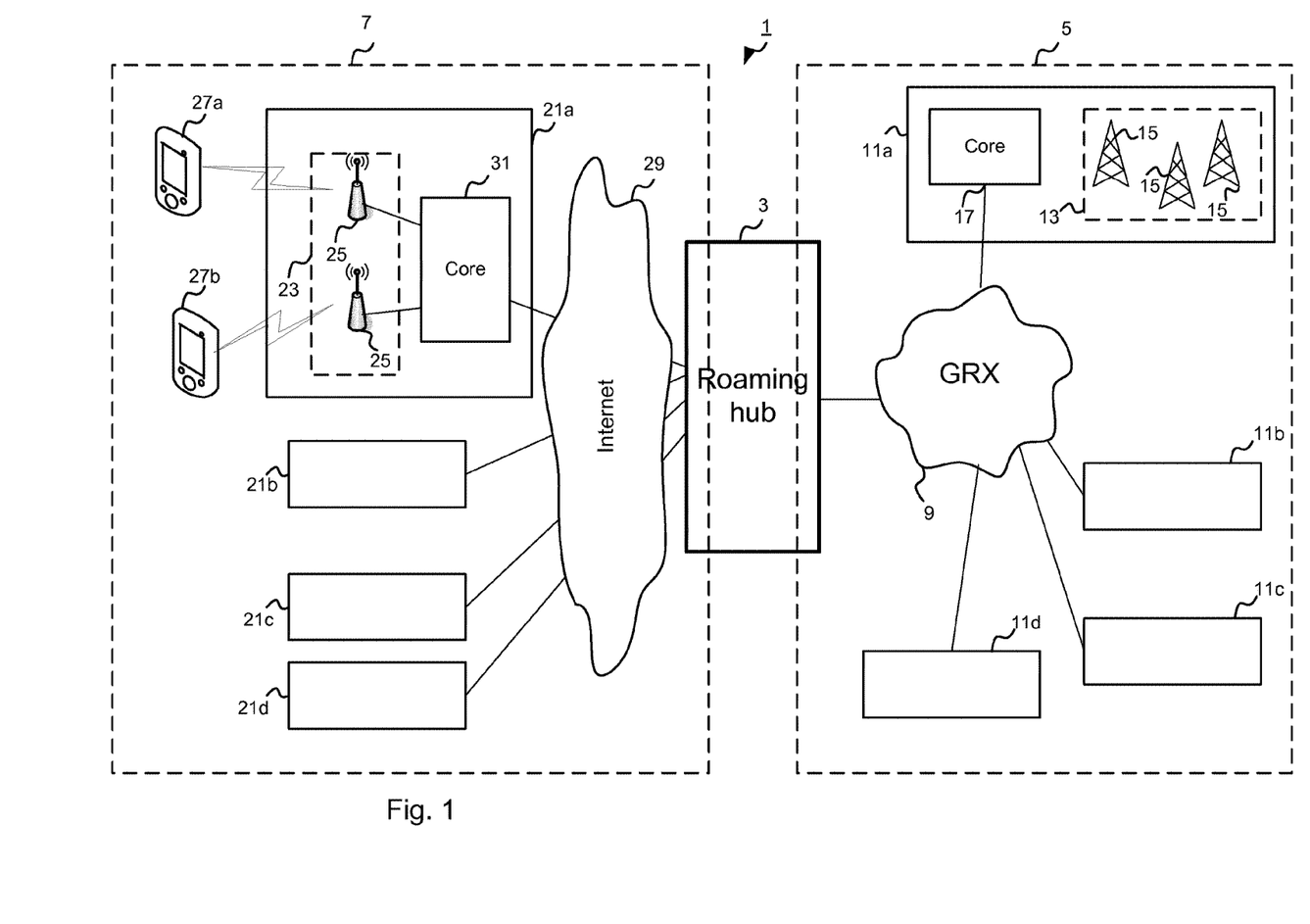
FIG. 1 shows an overview of a roaming network in accordance with a first embodiment.

FIG. 1 shows a roaming network 1 in which a roaming hub 3 connects both an MNO cellular network domain 5 and a WFO hotspot network domain 7.

The MNO domain 5 includes the GRX 9 and a number of cellular networks 11 connected to the GRX 9. Each cellular network 11 has a geographic coverage defined by the extent of its radio access network 13 of macrocells 15 such as eNodeBs in a Long Term Evolution (LTE) network. Each cellular network 11 also has a network core 17 for providing control functions such as subscriber authentication, packet routing and call routing as is conventional.

As an example, a first cellular network 11a is located in the United Kingdom, a second cellular network 11b is located in Germany, a third cellular network 11c is located in China and a fourth cellular network 11d is located in USA.

As mentioned above, to improve cellular roaming infrastructure, the GRX 9 is connected to each of the cellular networks 11 so that roaming is possible between each of the cellular networks 11. Furthermore, in this embodiment, the roaming hub 3 itself is also connected to the GRX 9 and appears as a roaming node within the GRX 9 and is part of the MNO network domain 5.

The WFO hotspot network domain 7 includes a number of hotspot networks 21 which are located in different geographic areas. For example, a first hotspot network 21a is located in UK, a second hotpot network 21b is located in France, a third hotspot network 21c is located in Australia and a fourth network 21d is located in New Zealand.

Each hotspot network 21 has a radio access network 23 formed of wireless access points 25 covering a much smaller area than that of a cellular network, for example the first hotspot network 21a covers London, the second hotspot network 21b covers Paris, the third hotspot network 21c covers Sydney and the fourth hotspot network covers Auckland. Furthermore, due to the limited range of wireless access points 25 and their limited density of deployment, there may be coverage gaps throughout each network 21.

Each wireless access point operates a wireless local area network (WLAN) in accordance with the IEEE 802.11 family of wireless protocols, commonly known as Wi-Fi, and in this embodiment the wireless access points use a mixture of 802.11n and 802.11ac in the 2.4 Ghz and 5 Ghz ranges respectively. Due to the signal propagation characteristics of a wireless signal being dependent on frequency, 2.4 Ghz WLANs are generally preferred because they have a greater range than that of a 5 Ghz WLAN. Devices such as mobile phones 27 operating in accordance with 802.11 can connect to the WLAN in order to access remote data services such as the Internet 29.

Unlike a private WLAN, the wireless access points 25 in a hotspot network 21 are not responsible for authentication of UEs or client devices 27 onto the hotspot network 21. This is instead handled by a hotspot network core 31 connected to each of the wireless access points 25 which provides centralized authentication onto the network 21. The wireless access points 25 allow devices 27 to associate with them, but then directs the devices to the network core 31 which contains authentication credential information for all registered subscribers.

In accordance with the WFO roaming infrastructure of the first embodiment, the hotspot networks 21 are connected to the roaming hub 3 to allow cellular network UEs to roam onto the hotspot network. As shown in FIG. 1, UEs 27 belong to subscribers of one of the cellular networks 11 but they can also access hotspot networks 21 using a WLAN interface. In FIG. 1, device 27a is a subscriber of the UK cellular network 11a while device 27b is a subscriber of the USA cellular network 11d.

As will be described in more detail later, the roaming hub 3 acts as a bridge between the cellular network domain 5 and the WFO hotspot network domain 7. It contains interfaces to transfer data with hotspot networks 21 via secure data tunnels (IPSec) and also interfaces to transfer data with cellular networks 11 via the GRX 9. Since the GRX 9 is a secure network, it is not necessary for the MNO domain 3 tunnels to be explicitly secured.

In general, when a UE device 27 is not a native subscriber of a hotspot network 21, the authentication function of a hotspot network 21 will need to determine whether the UE 27 is a roaming device belonging to a cellular network 11 that can be reached via the roaming hub and to check if the UE's home network can be reached via the roaming hub 3. If it can, then the authentication function is configured to pass the authentication information to the roaming hub 3 which will then forward the authentication data to the UE's home cellular network 11 via the GRX 9. Once authenticated, the device 27 will be able to roam onto the hotspot network 21 with all control and data sessions being tunneled to the Home cellular network 11.

The roaming hub simplifies the roaming process for MNO networks and WFO networks. When a roaming customer arrives at a hotspot network, the authentication function does not need to know how to route traffic to the home cellular network. If only needs to known if the home network can be reached via the roaming hub. The roaming hub is a central directory with knowledge of the hotspot networks and cellular networks and routes the data accordingly.

Whilst the roaming hub 3 can potentially enable subscribers of any cellular network 11 to roam via any hotspot network 21, there may be commercial or other reasons why an MNO may want to exclude certain hotspot networks 21 from being used by their subscribers for roaming. In order to implement this, the cellular networks 11 will have an access list in the form of a blacklist and/or white list. As is conventional, if a blacklist is used then roaming is allowed for subscribers of any cellular network except those which are specifically excluded, while in a white list implementation, the default position is to block any roaming subscribers attempting to connect except those which appear on the white list.

Rather than identify each and every possible cellular network individually, the access lists formed of blacklists and white list are established based on groups of networks known as realms.

Realms

Figure 2:
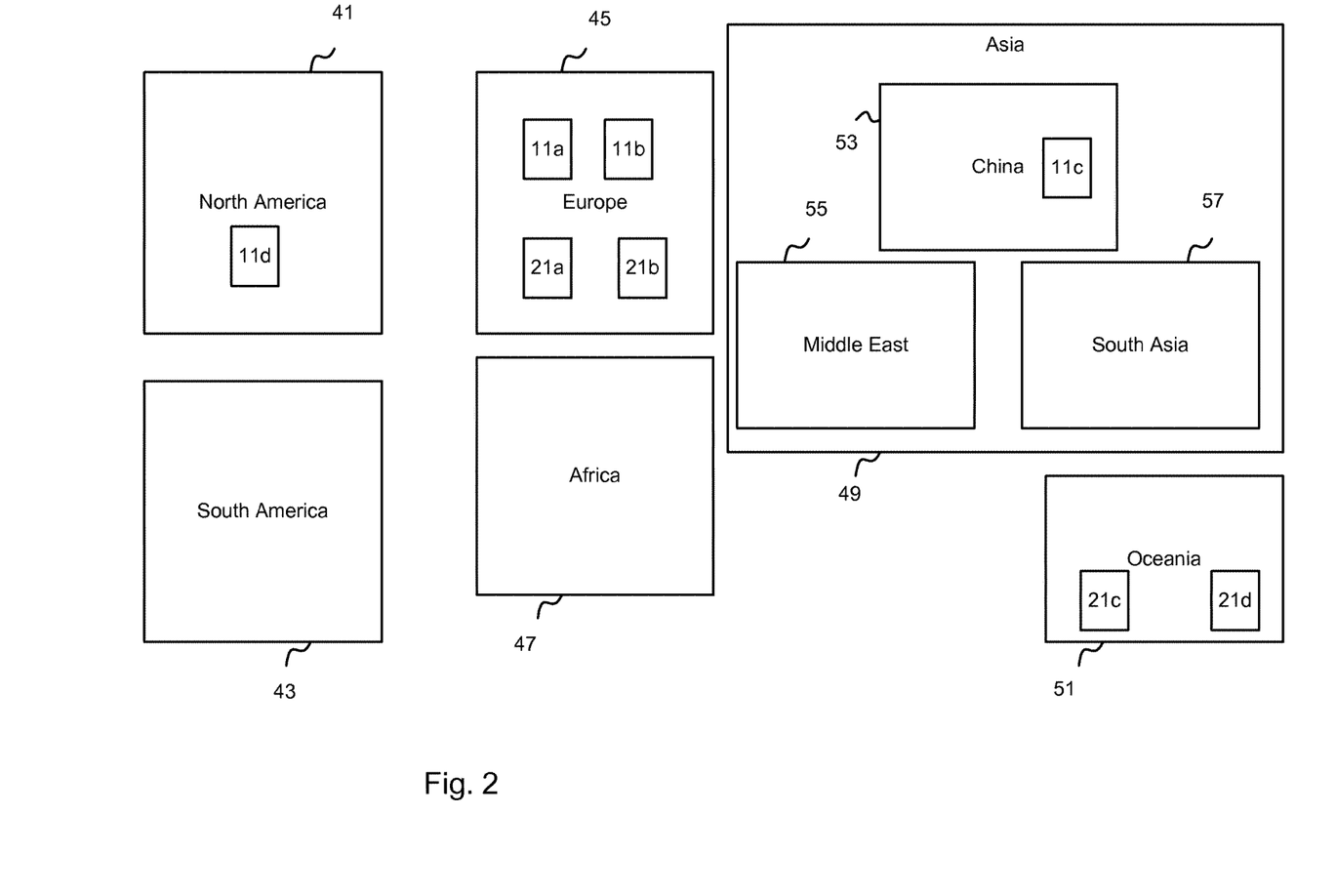
FIG. 2 shows an example of how cellular networks can be divided into geographical realms.

FIG. 2 shows an example of realms defined based on geography. In particular, there are realms for the continents of North America 41, South America 43, Europe 45, Africa 47, Asia 49 and Oceania 51.

Furthermore smaller geographic regions can be defined as realms within realms where greater granularity is required. For example in Asia 49, further realms can be defined for East Asia 53, the Middle East 55, and South East Asia 57. Realms can also be defined as countries.

In addition to geographic areas being defined as realms, realms can also be defined based on parent networks or commercial partnerships etc.

Finally, the realms can simply be defined as relating to individual cellular networks.

Any cellular network will be associated with at least one realm. For example, a cellular network in the UK could be part of the Europe realm 45, any smaller geographical realms such as Western Europe and UK, and any non-geographical realm definitions such as the cellular network itself being an individually identifiable realm. The hotspot networks 21 are similarly grouped into realms.

For the example cellular networks 11a, 11b, 11c, and 11d, and hotspot networks, the following realm information is as shown below:

| Realm | Associated networks |
| --- | --- |
| 41 | 11d |
| 43 | |
| 45 | 11a, 11b, 21a, 21b |
| 47 | |
| 49 | 11c |
| 51 | 21c, 21d |
| 53 | 11c |
| 55 | |
| 57 | |

Cellular networks can be associated with realms based on their Mobile Country Code (MCC) and Mobile Network Code (MNC). Hotspot networks use a similar identifier.

Furthermore, to prevent unnecessary network traffic, the hotspots networks contain a routable realm list identifying the realms which can be reached via the roaming hub 3 and will allow hotspot network roaming.

An example routable realm list for each of the hotspot networks 21 is shown below.

| Hotspot network | Routable Realms |
| --- | --- |
| 21a | 41, 43, 45, 47, 49, 51, 53, 55 |
| 21b | 45 |
| 21c | 49 |
| 21d | none |

The routable realm list is typically established and set up when the hotspot is established and only periodically updated as a manual process by a system administrator as bilateral agreements are made between the hotspot network and new partner networks or organizations. However, in the case of the roaming hub and its connection to the GRX, the cellular networks which can be routed by the roaming hub will be changing more rapidly as new networks join the GRX, networks leave the GRX or are virtually added/removed based on changing access list blacklist/white list parameters.

Without more timely updates, there will be situations where subscribers of particular cellular networks are rejected when they should be accepted and accepted when they should be rejected.

To improve the system between the hotspot networks and the cellular networks, in the first embodiment, the roaming hub, hotspot controller and cellular network controllers are adapted to allow more dynamic access control.

Figure 3:
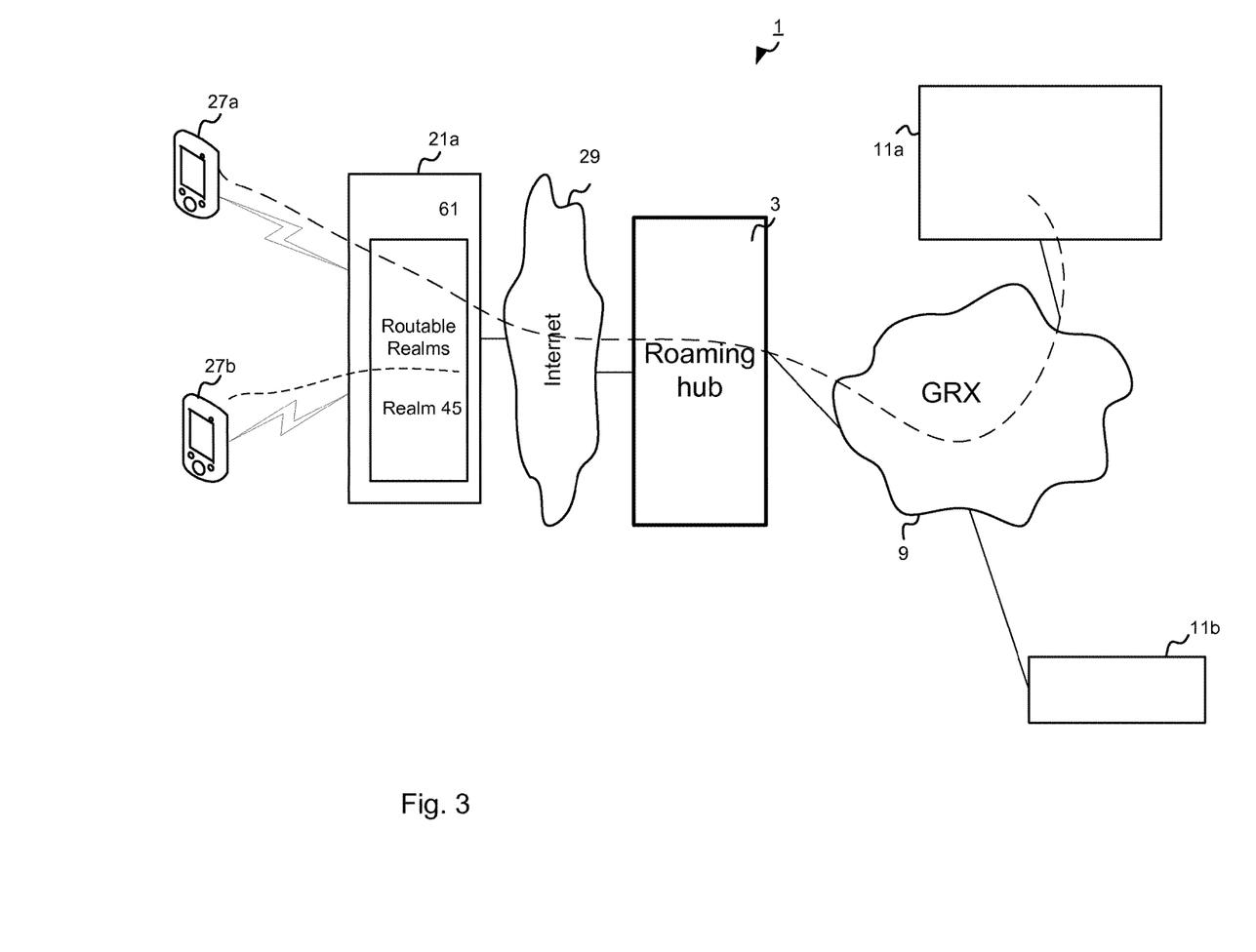
FIG. 3 shows a simplified view of the network in FIG. 1 to illustrate the operation of the first embodiment.

FIG. 3 shows a simplified view of the network 1 to illustrate an example of the operation of the first embodiment.

As mentioned above, device 27a is a subscriber of cellular network 11a which is near to a WLAN of hotspot network 21a. When the device 27a tries to connect to the hotspot network 21a, the controller will determine the realm associated with the UE device's home cellular network by extracting identifier information from the SIM card. The retrieved realm is used to consult a routable realm list 61 which contains a list of realms that the hotspot network can access via the roaming hub 3. Since the realm of the cellular network 11a, the European realm 45 is present in the routable realm list, then the hotspot network controller will forward the authentication credentials to the roaming hub 3. Furthermore, once connected, the hotspot network 21 and client device 27 are provided with roaming configuration information specific to the UE's home cellular network. For example a splash page to inform the user that they are on WLAN roaming and whether the hotspot network should perform local breakout for data traffic or tunnel all control and data traffic back to the cellular network.

FIG. 3 also shows a second device 27b trying to roam via the hotspot network 21a. The second device 21b is a subscriber of a cellular network 11d in the North America realm 41. However, since the realm of this cellular network 11d, it does not appear in the routable realms list 61 at the hotspot network 21a, the hotspot controller does not know how to connect this second device 27b to its home network even though the cellular network 11d is reachable via the GRX 9. In this case, the delay in updating the routable realms list 61 resulted in a loss of service for some subscribers.

In the first embodiment, each cellular network 11 maintains an access list having blacklist/white list of hotspot networks which its subscribers are allowed to use for roaming as usual. However, the roaming hub which has knowledge of both the MNO cellular network domain 5 and the WFO hotspot domain 7 is modified to be able to use the access list information and collate the information received from the cellular networks to modify and update each hotspot network's routable realms list.

Figure 4:
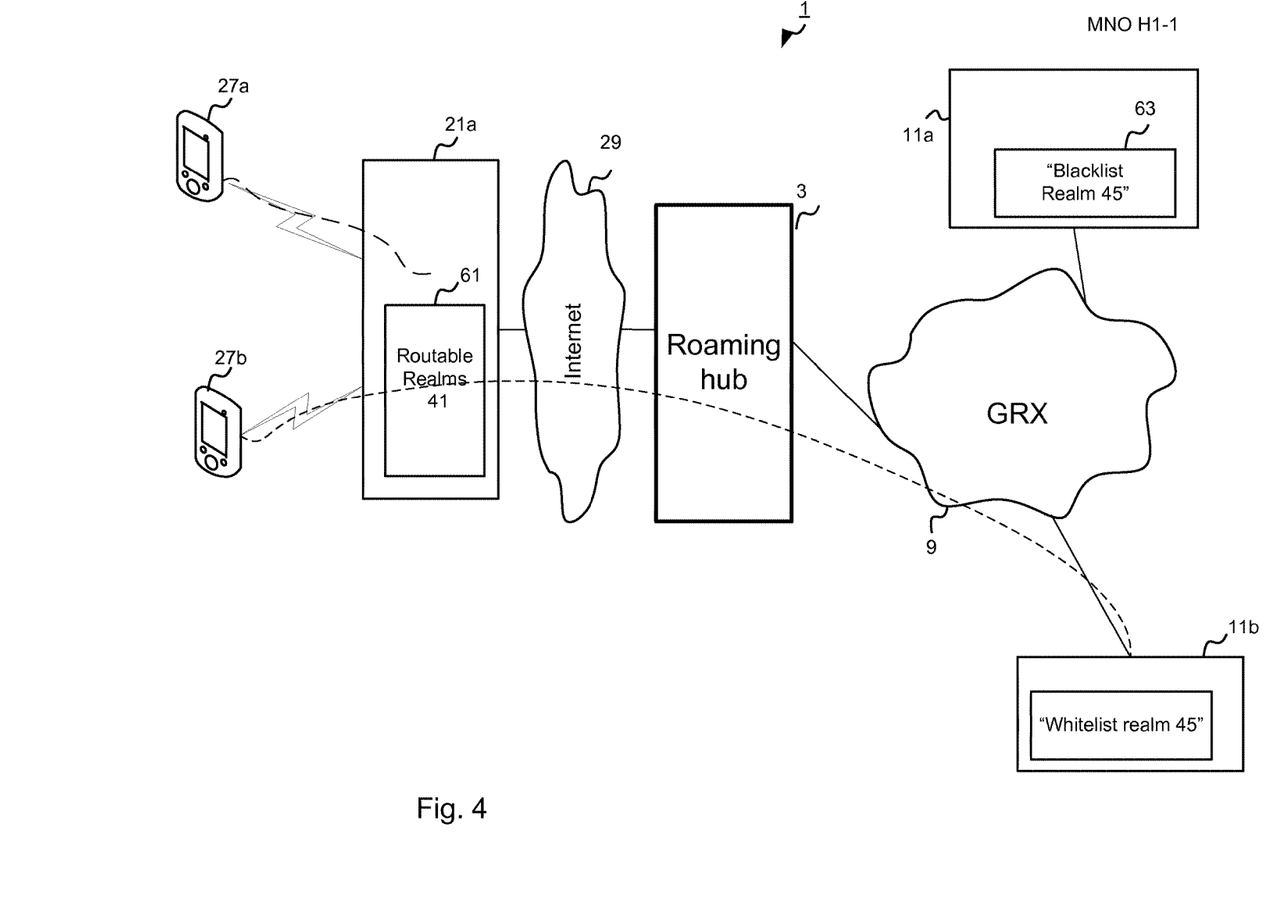
FIG. 4 shows a simplified view of the network in FIG. 1 after the processing of the first embodiment.

FIG. 4 shows a scenario whereby the cellular network 11a in the European realm 45 has updated its access list 63 to exclude the European realm 45 so that its subscribers will not be allowed to roam via any hotspot in the European realm such as hotspot 21a. Also, the cellular network 11d in the North America realm 41 has added the European realm 45 to its access list so that roaming from hotspot networks located in the European realm 45 is allowed.

The cellular networks 11 are configured to periodically send access lists to the roaming hub 3. The roaming hub 3 processes the sets of data from the cellular networks 11 and collates the data to produce specific routable realm lists for each connected hotspot network 21 based on any relevant entries from the received cellular network messages.

The hotspot networks 21 are arranged to receive these routable realm messages and use them to update their routable realms list 61 to change their roaming behavior with respect to which subscribers are allowed to roam.

As shown in FIG. 4, now that cellular network 11a in realm 45 has blacklisted the European realm 45 which includes hotspot network 21a and cellular network 11d has whitelisted the European realm 45, the new routable realm list for hotspot 21a contains the North America realm 41. In this way, subscribers of cellular network 11a are no longer allowed to roam onto hotspot network 21a but subscribers of cellular network 11d are allowed to roam onto hotspot network 21a. If at a later time cellular network 11a removes the European realm from its blacklist 63, then subscriber devices of the cellular network 11a will again be able to roam using the hotspot network 21a after another roaming hub update.

The roaming hub of the first embodiment will now be described.

Figure 5:
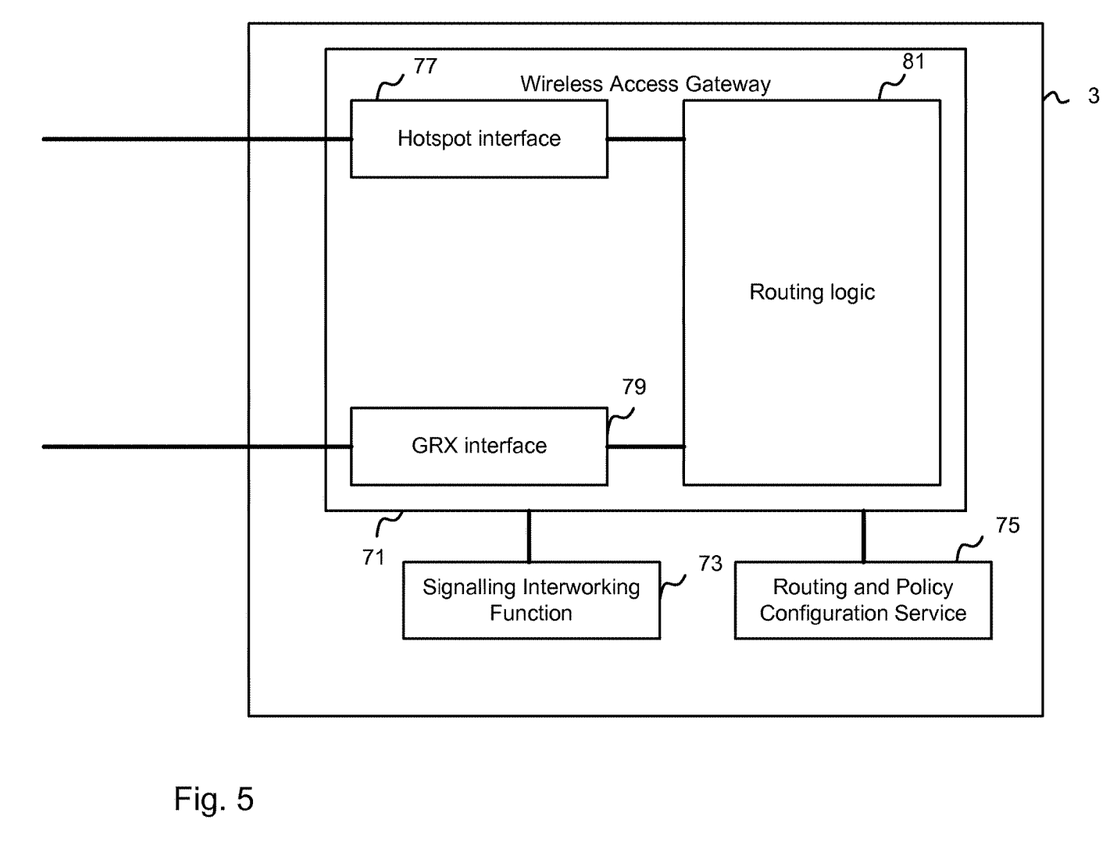
FIG. 5 shows the functional components of a roaming hub in accordance with the first embodiment.

FIG. 5 shows components of the roaming hub 3. The three main functional units of a roaming hub 3 in the first embodiment are a Wireless Access Gateway (WAG) 71, a Signaling Internetworking Function (SIF) 73 and a Routing and Policy Configuration Service (RPCS) 75.

The wireless access gateway 71 includes a plurality of interfaces for communication of data with a number of different network components in the roaming network 1. As shown, there is a hotspot network interface 77 for communication with hotspot networks 21 and a GRX interface 79 for communication with the hotspot networks 21 and cellular networks 11 respectively. A routing logic function 81 provides a packet switching interconnect for directing data packets to the relevant interface.

The SIF 73 is responsible for handling signaling data and in particular in relation to the authentication process between the client device 27 and its subscriber cellular network with regard to converting between the various authentication, authorization and accounting (AAA) protocols including Remote Authentication Dial-In User Service (RADIUS), DIAMETER and Mobile Application Part (MAP).

The Roaming policy configuration service (RPCS) 75 is responsible for the access control functions of the hotspot networks by collectively processing each connected cellular network's blacklist/whitelist lists and generating a routable realm list for each connected hotspot network.

Figure 6:
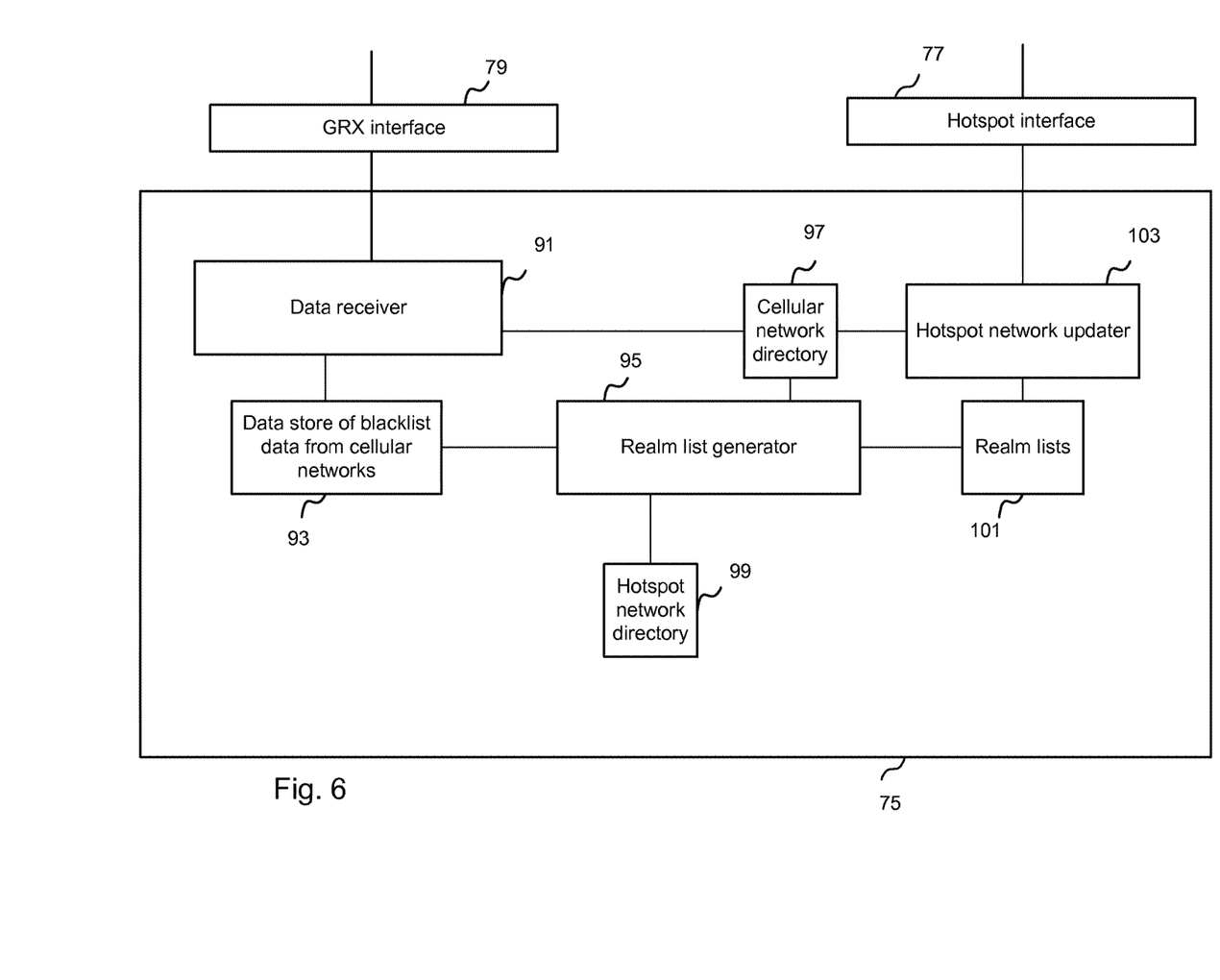
FIG. 6 shows the functional components of a roaming policy server/service.

FIG. 6 shows the functional components of the Roaming policy configuration service (RPCS) 75 integrated into the roaming hub.

The RPCS is responsible for collecting access list control information from each of the connected cellular networks, processing the received data to determine which realms are allowed for roaming, and generate a routable realm list for each hotspot network based on the cellular network preferences.

The RPCS is linked to the GRX interface 79 to receive access control information in the form of the access lists in the form of blacklists and whitelists from the various cellular networks.

The GRX interface 79 is linked to a data receiver 91 which stores the received data from the cellular networks 11 in a data store 93. Since the cellular network data can be received according to a schedule or asynchronously, the data store 93 saves each set of data with a cellular network identifier and a time stamp.

A realm list generator 95 is responsible for determining routable realm lists for each of the hotspot networks 11. The generator 95 takes as input the received access information in the data store 93 and also information about the cellular networks and hotspot networks stored in a cellular network directory 97 and a hotspot network directory 99, respectively. The cellular network directory indicates which realms are associated with a cellular network since a cellular network may belong to multiple realms. Similarly the hotspot network directory 99 indicates which realms are associate with a hotspot network.

For each hotspot network, a search is performed on the received access list data to determine the realms of any cellular networks which have blacklisted or whitelisted realms that are associated with that hotspot network. This is repeated until all hotspot networks have been considered.

The generated realm lists are stored in a realm list store 101. Each entry relates to a realm which is connected to the roaming hub 3. A hotspot network updater 103 takes the realm lists and sends lists to the appropriate hotspot network.

As mentioned above, in addition to the access lists, a cellular network can provide additional configuration information to control how the hotspot network routes traffic to the cellular network. This data can be received by the data receiver 91 and the updates are stored in the cellular network directory 97.

In this embodiment, the additional information can include:

Time of day scheduling—on load/off load traffic only during specific times

Local breakout/home routing rules—traffic destinations to either be broken out in the visited network or delivered to the home network QoS rules—Home routed traffic destinations that should have specific DSCP (DiffServ) markings applied to the IP packets Traffic routing type i.e. IP based or GTP List of domain name servers AAA Proxy address—address to send authentication signaling to APN—destination address to where traffic should be delivered An expiry time—indicating when the VNP should request a configuration update for the realm To minimize the overhead of the realm list updates on the data links between the roaming hub 3 and the hotspot networks 21, the configuration information is not sent to the hotspot networks 21 along with the realm lists. Instead, the hotspot network updater 103 is configured to receive requests for the configuration information from hotspot networks for the configuration information only when required, namely when a subscriber device 27 of a cellular network 11 that is on the routable realm list tries to roam on the hotspot network 21.

Furthermore, the cellular networks can provide multiple sets of configuration data that are active at different times of day, in accordance with network load conditions, or applicable to different realms.

Figure 7:
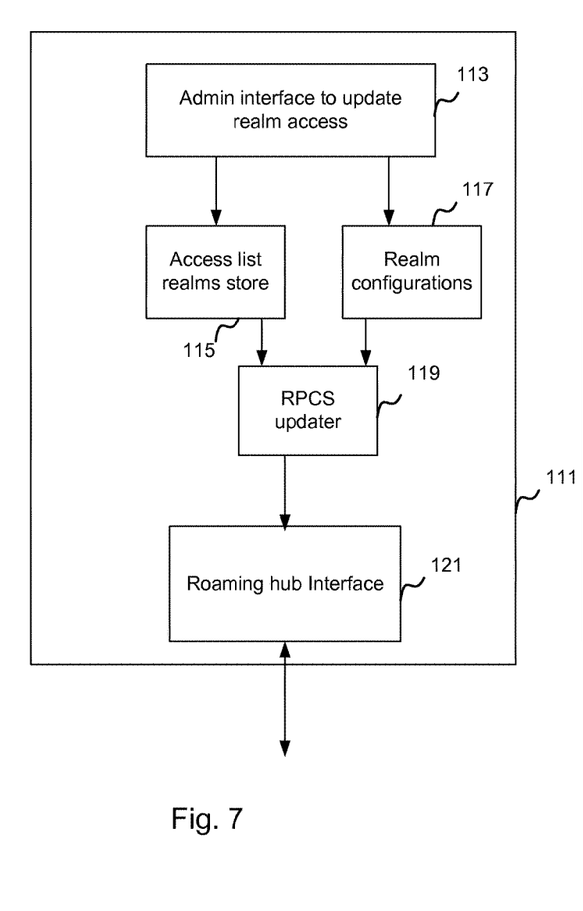
FIG. 7 shows the components of a realm update server within a network core of a cellular network.

FIG. 7 schematically shows the components of a realm update server 111 within the network core 17 of a cellular network 11 in the first embodiment.

The realm update server 111 provides a user interface 113 to allow an administrator of the cellular network to update an access list of realms in the form of blacklists and/or whitelists. Updates may occur due to commercial or political situations. For example to add new operating partner realms or to blacklist certain countries.

The updated realm access information is stored in an access list realm store 115.

In addition to the realms, the administrator can also update any configuration data to be used by the roaming hotspot networks as explained above. The updated real configurations are stored in a realm configurations store 117.

A RPCS updater 119 is configured to periodically check the access list realms store 115 and the realm configurations store 117 for updated information and send the new information to the data receiver 91 of the RPCS 75 via a roaming hub interface 121.

Alternatively user interface 113 is configured to trigger the RPCS updater 119 to perform an update as soon as the administrator has finished updating the access lists and/or configuration information.

Figure 8:
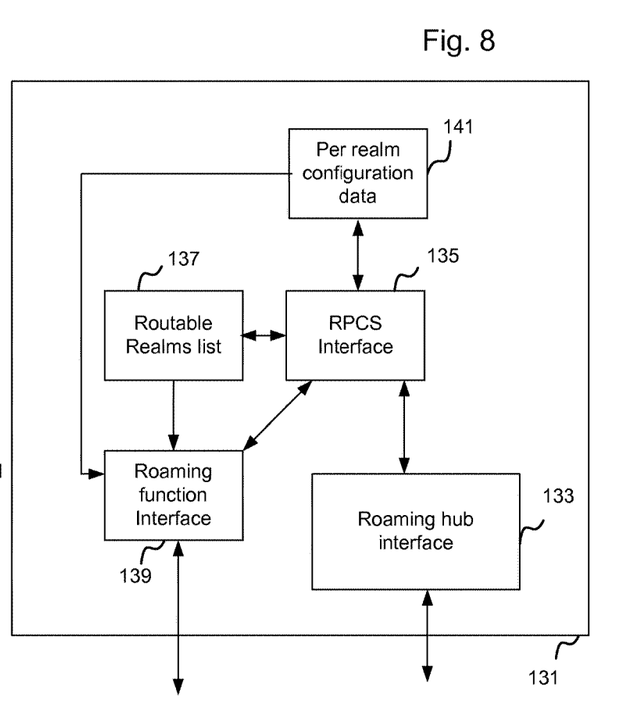
FIG. 8 shows the components of a realm update function within a network core of a hotspot network.

FIG. 8 schematically shows the components of a realm update function 131 in the core 31 of a hotspot network 21 in accordance with the first embodiment.

The realm update function 131 has a roaming hub interface 133 for communication with the roaming hub 3. Furthermore, a RPCS interface 135 is responsible for receiving the new access lists and storing realm information in a routable realms list 137. A roaming function interface 139 in the network core 31 of the hotspot network 21 is provided to allow a roaming function to access the latest routable realm list.

The roaming function of the hotspot network will operate in a conventional manner using the new routable realm list to determine whether the hotspot network can provide roaming support to a subscriber of a cellular network.

As described above, the routable realms information is pushed from the RPCS 75 to each hotspot network 21 but the configuration information for each realm is only retrieved when a subscriber device 27 of a routable realm tries to roam via the hotspot network 21. Therefore the RPCS interface 135 is informed via the roaming function interface when a subscriber of a routable realm has connected and in response to the notification it will request the latest configuration information from the roaming hub 3 via the roaming hub interface 133. The received configuration information for the relevant realm is stored in a per realm configuration data store 141 which is also linked to the roaming function interface 139.

The processing of the first embodiment provides an update mechanism to allow a roaming network to respond more quickly to changes in the relationship between cellular networks and hotspot networks.

Alternatives and Modifications

In the embodiment, the cellular networks can specify realms to be blacklisted which is then processed by the RPCS to generate the routable realms list for any given hotspot network. In this way, the cellular networks can specify which hotspot networks are allowed for roaming.

The first embodiment considers all hotspot networks as being enabled to carry data for any network and only the cellular networks can exclude hotspot networks. However, in a modification, the hotspot networks are also be configured to specify any realms of cellular networks that they do not wish to carry network traffic. For example, hotspot network 21d in New Zealand may also blacklist any all realms other than Oceania 51 such that it cannot support roaming for UEs of any cellular networks based outside of the Oceania realm. Therefore even if a cellular network in the European realm hasn't blacklisted the Oceania realm, roaming from that particular hotspot network to the European realm will not be allowed.

In the embodiment, there is a single roaming hub to provide the interface between hotspot networks and cellular networks. In a modification, there may be a number of different roaming hubs connected to different set of realms. Each roaming hub can be configured to provide updated routable realm lists to the hotspot networks so that they are configured to direct roaming UEs to the correct roaming hub to reach the UE's home cellular network.

In a further modification, where some of the realms are reachable via either of the different roaming hubs, then the hotspot controller can include further processing to determine which roaming hub to use in accordance with load, cost, etc. This processing can improve the roaming experience for the customer by reducing the cost of roaming or improving the response time.

In a further modification, in some cases, the hotspot controller may be configured to directly interface with a cellular network in certain realms and bypass the roaming hub. An example scenario is where the cellular network and hotspot network are owned by the same parent company acting as both a MNO and WFO and therefore the overhead incurred by using the roaming hub and GRX can be avoided.

In the embodiment, the routable realm generator provides new routable realm lists periodically. In an alternative, the hotspot networks can request a new updated routable realm list at any time and the routable realm list generates a new list accordingly.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of operating an interconnect server for a roaming network, the roaming network having a plurality of cellular networks and a plurality of hotspot networks formed of wireless access points, the interconnect server being connectable to a routing server within each of the plurality of cellular networks and to a routing server within each of the plurality of hotspot networks, wherein the plurality of hotspot networks are operable to allow subscriber devices of the plurality of cellular networks to connect to a wireless access point forming part of the hotspot network and access the subscriber cellular network of the subscriber devices, comprising:

receiving from at least one routing server of the plurality of cellular networks an access list specifying access permissions identifying at least one hotspot network which can be used by subscribers for data roaming;

storing the access list received from at least one cellular network;

processing the access list to generate, for each hotspot network, a routable roaming list identifying cellular networks that can be reached via the interconnect server; and sending the generated routable roaming lists to the respective hotspot network, wherein the generated routable roaming lists are for configuring the hotspot network to route traffic of subscriber devices of the cellular networks in accordance with the access permissions received from the at least one plurality of cellular networks.

2. The method according to claim 1, further comprising
receiving a set of configuration parameters from each cellular network server with the access lists, the configuration parameters relating to how a hotspot network should handle a subscriber of that cellular network;
storing the sets of configuration parameters;
processing a request from a hotspot network for a set of configuration parameters; and
sending the requested set of configuration parameters.

3. The method according to claim 2, wherein a plurality of sets of configuration parameters are received from each cellular network server, each of the plurality of sets relating to a different context;
and the method further comprises sending a context relevant set of configuration parameters in response to a request from a hotspot.

4. The method according to claim 1, wherein the access lists specify at least one blacklisted hotspot network.

5. The method according to claim 1, wherein the access lists identify at least one whitelisted hotspot network.

6. An apparatus for a roaming network, the roaming network having a plurality of cellular networks and a plurality of hotspot networks formed of wireless access points, wherein the plurality of hotspot networks are operable to allow subscriber devices of the plurality of cellular networks to connect to a wireless access point forming part of the hotspot network and access the subscriber cellular network of the subscriber devices, comprising:
a first network interface for connecting to a routing server within each of the plurality of cellular networks;
a second network interface for connecting to a routing server within each of the plurality of hotspot networks;
a receiver for receiving from at least one routing server of the plurality of cellular networks an access list specifying access permissions identifying at least one hotspot network which can be used by subscribers for data roaming;
a data store for storing the access list received from at least one cellular network;
a processor for processing the access list to generate, for each hotspot network, a routable roaming list identifying cellular networks can be reached via the interconnect server; and
a data sender for sending the generated routable roaming lists to the respective hotspot network,
wherein the generated routable roaming lists are for configuring the hotspot network to route traffic of subscriber devices of the cellular networks in accordance with the access permissions received from the at least one plurality of cellular networks.

7. The apparatus according to claim 6, wherein:
the receiver is further operable to receive a set of configuration parameters from each cellular network server with the access lists, the configuration parameters relating to how a hotspot network should handle a subscriber of that cellular network and store the sets of configuration parameters in the data store;
the apparatus further comprising a request processor for processing a request from a hotspot network for a set of configuration parameters; and
wherein the data sender is configured to send the requested set of configuration parameters to the requesting hotspot network.

8. The apparatus according to claim 7, wherein a plurality of sets of configuration parameters are received from each cellular network server, each set relating to a different context;
wherein the data sender is operable to send a context relevant set of configuration parameters in response to a request from a hotspot.

9. The apparatus according to claim 6, wherein the access lists specify at least one blacklisted hotspot network.

10. The apparatus according to claim 6, wherein the access lists identify at least one whitelisted hotspot network.

11. A non-transitory computer-readable storage medium storing processor executable instructions for causing a programmable processor executing the instructions to carry out the method according to claim 1.

* * * * *